United States Patent [19]

Durkin

[11] 4,255,251
[45] Mar. 10, 1981

[54] HYDROCRACKING PROCESS AND CATALYST

[75] Inventor: Joseph A. Durkin, Groves, Tex.

[73] Assignee: Texaco Inc., White Plains, N.Y.

[21] Appl. No.: 61,733

[22] Filed: Jul. 30, 1979

[51] Int. Cl.$^3$ .............................................. C10G 47/20
[52] U.S. Cl. ............................. 208/108; 208/52 CT; 208/111; 252/415; 252/417; 423/244
[58] Field of Search ................................ 208/108–112, 208/52 CT; 423/244; 252/411 R, 415, 416–420, 440

[56] References Cited

U.S. PATENT DOCUMENTS

| | | | |
|---|---|---|---|
| 1,915,618 | 6/1933 | Ralston et al. | 252/415 X |
| 2,394,739 | 2/1946 | Archibald | 252/415 |
| 2,476,143 | 7/1949 | Gullette | 208/164 |
| 2,772,947 | 12/1956 | Sowerwine | 252/415 X |
| 3,891,539 | 6/1975 | Nelson et al. | 208/59 |
| 4,102,811 | 7/1978 | Burk et al. | 252/411 R |
| 4,133,743 | 1/1979 | Boret et al. | 208/64 |
| 4,146,463 | 3/1979 | Radford et al. | 423/244 X |
| 4,166,024 | 8/1979 | Swan | 208/65 |

*Primary Examiner*—Herbert Levine
*Assistant Examiner*—G. E. Schmitkons
*Attorney, Agent, or Firm*—Carl G. Ries; Robert A. Kulason; Robert Knox, Jr.

[57] ABSTRACT

A hydrocracking process for the conversion of heavy hydrocarbon oils and a catalyst therefore which comprises a hydrogenating component and a cracking component including a modified crystalline zeolite and at least one amorphous inorganic oxide support material. The process includes a method of treatment of the catalyst for mildly promoting the activity of fresh catalyst or partially restoring the activity of spent catalyst.

10 Claims, No Drawings

HYDROCRACKING PROCESS AND CATALYST

This invention relates to a hydrocarbon conversion process. In one of its more specific aspects, this invention is concerned with a process and catalyst for the conversion of heavy hydrocarbon distillates and residua into lower molecular weight products by a hydrocracking process. The process of the subject invention includes a novel method for treatment of catalysts comprising one or more of the metals of Group VIII, particularly cobalt, nickel, palladium, or platinum alone or in conjunction with a Group VIB or Group VIIB metal, e.g., rhenium, molybdenum or tungsten, on a suitable support. Suitable support materials include silica-alumina, silica-magnesia, and silica-zirconia composites, bentonite, kaolin, and the like, optionally also including a natural or synthetic zeolite.

Hydrocracking catalysts generally are bi-functional and contain two major components, a hydrogenating component and a cracking component. Generally, the hydrogenating component is an active metal from Group VIII of the Periodic Table on a suitable solid porous support which contains acid sites which perform the cracking function. It is recognized that the support materials for hydrocracking catalysts should be acidic to promote the cracking portion of the hydrocracking reaction.

U.S. Pat. No. 3,816,297 discloses a hydrocracking catalyst which may be used for treatment of petroleum fractions, such as heavy distillates and residua which have a relatively high organic nitrogen content. In one of its more specific embodiments of the present invention, a nickel-tungsten/zeolite hydrocracking catalyst of the type disclosed in U.S. Pat. No. 3,816,297 is promoted by treatment with sulfur dioxide and water vapor in the presence of free oxygen.

The catalyst used in the process of our invention contains two components, a hydrogenating component and a cracking component, the cracking component optionally comprising a solid zeolite matrix support. Suitable hydrogenating components comprise metals and compounds of metals of Group VIII, e.g., the noble metals, particularly platinum and palladium, and the iron group metals, particularly cobalt and nickel. Advantageously, the iron group metal catalyst may also contain a Group VI metal, e.g., molybdenum or tungsten. While the noble metal catalyst may contain a Group VII metal, e.g., rhenium. The hydrogenating component may be either in metallic form or in the form of a compound, e.g., the oxide, sulfide, or telluride.

The cracking component of the catalyst comprises at least one amorphous inorganic oxide, optionally in admixture with a crystalline zeolite; the zeolite, if present, may comprise 10 to 60 percent by weight of the cracking component. Suitable amorphous inorganic oxides are those having cracking activity, such as silica, alumina, magnesia, zirconia, and beryllia, which may have been treated with an acidic agent, such as hydrofluoric acid, to enhance catalytic activity. A preferred mixture of amorphous inorganic oxides comprises silica-alumina in a proportion ranging from 60 to 90 percent by weight silica and 10 to 40 weight percent alumina.

The modified zeolite portion of the cracking component preferably has uniform pore openings of from 6 to 15 Angstrom units, a silica-alumina ratio of at least 2.5, e.g., 3 to 10. The preferred hydrogen form of the zeolite may be prepared by subjecting an alkali metal Y type zeolite to ion exchange with an aqueous solution of an ammonium compound at a temperature in the range of about 38° and 120° C. (about 100° to 200° F.), preferably until the ion exchange is substantially complete. The ion exchanged zeolite may be washed to remove solubilized alkali metal and dried at a temperature sufficiently high to drive off ammonia. The zeolite is then in the hydrogen form and has an alkali content of about 2 to 4 weight percent. The ion exchanged zeolite is calcined at a temperature of about 540° C. (1000° F.) for several hours. The alternating sequence of ion exchange and calcination may be repeated one or more times as disclosed in U.S. Pat. No. 3,816,297, the disclosure of which is incorporated herein by reference. The final calcination temperature should not exceed 650° C. (about 1200° F.).

When the hydrogenating component of the hydrocracking catalyst is a noble metal it should be present in an amount between about 0.2 and 5.0 percent by weight based on the total catalyst composite. Preferably the noble metal is present in an amount between 0.5 and 2 percent. When the hydrogenating component comprises a Group VIII metal it should be present in an amount between about 1 and 40 percent weight based on the total catalyst composite. If the iron group metal is the sole hydrogenating catalyst, it may be present in an amount between about 5 and 10 percent. When a Group VI metal is used in conjunction with a Group VIII metal, the Group VI metal may be present in an amount preferably between about 5 and 30 percent. Particularly suitable catalysts are those containing between 0.5 and 1.0 weight percent noble metal and those containing between 5 and 10 percent iron group metal and between 15 and 30 percent Group VI metal. Specific examples of suitable catalysts are those containing 0.75 weight percent palladium or containing about 6 percent nickel and 20 percent tungsten on a support made up of about 20 percent zeolite, 58 percent silica and 22 percent alumina.

A particularly suitable catalyst is one which contains between 5 and 10 percent by weight nickel and between about 5 and 30 weight percent tungsten. One specific example of a preferred catalyst is one containing about 6 to 7 percent nickel and about 20 percent tungsten on a support made up of about 20 percent zeolite Y, 58 percent silica and 22 percent alumina, all percentages by weight.

The hydrogenating component is deposited on the cracking component by impregnating the latter with the solution of a compound of the metal hydrogenating component. Such techniques are well known in the art and require no detailed description.

When used in the sulfide form, the freshly prepared catalyst may be sulfided by methods well known in the art, such as by subjecting the catalyst at a temperature in the range of about 200° to about 370° C. (about 400° to about 700° F.) to contact with a sulfiding agent, for example, hydrogen containing 10 to 20 volume percent hydrogen sulfide or carbon disulfide.

The charge stocks used as feed to the process in which such catalysts are used commerically include heavy distillates or residua, such as coker distillates, whole crudes, atmospheric residua, vacuum residua, tar sand oil, shale oil, and heavy cycle gas oils. The characteristics of these charges are that they contain a fraction which boils above about 454° C. (850° F.) and have a nitrogen content of at least 500 ppm. Usually, these materials also have a polycyclic aromatic content of at least 10 percent by volume. The hydrocracking catalysts of the type described decline in activity with use.

It has now been found that the activity of the catalyst may be at least partially restored by contacting the catalyst with a mixture of oxygen-containing gas, e.g., air, water vapor, and sulfur dioxide at an elevated temperature in the range of 200° to 425° C. (about 400° to 800° F.) for a period of time within the range of 2 to 24 hours, preferably 4 to 8 hours at a volumetric hourly space velocity of 1 to 500, preferably 100 to 150 standard volumes of gaseous mixture per volume of catalyst per hour (VHSV). Quite unexpectedly, it was found that this treatment also serves to improve or enhance the catalytic activity of the fresh catalyst. The treatment may be carried out at a pressure within the range of 3.5 to 350 kPa, suitably 100 to 105 kPa (essentially atmospheric pressure).

The relative proportions of air, water vapor, and sulfur dioxide are within the range of 0.01 to 10 parts by volume sulfur dioxide, and 0.01 to 2 parts by volume water vapor for each part by volume air utilized in the treatment of the catalyst. A preferred composition comprises, in parts by volume, 1 part sulfur dioxide, 0.37 parts water vapor, and 10 parts air. Expressed as percentages by volume, a preferred composition comprises 8.8 percent sulfur dioxide, 3.2 percent water vapor, and 88.0 percent air. Preferred compositions are generally within the range of 5 to 10 percent sulfur dioxide, 1 to 5 percent water vapor, and 94 to 85 percent air by volume.

The preferred relative proportions of air, water vapor, and sulfur dioxide are those within the range of 5 to 20 parts by volume air per part sulfur dioxide and 0.05 to 3 parts water vapor per part sulfur dioxide. If an oxygen-containing gas other than air, for example, oxygen-enriched air or relatively pure oxygen, is used in the treatment of the catalyst, the relative volumes of oxygen-containing gas should be adjusted to maintain approximately the same relative proportions of oxygen and sulfur dioxide as are present in the air-sulfur dioxide mixtures already mentioned.

The following examples illustrate the improved process and catalyst of the present invention.

EXAMPLE 1

A commercial spent nickel-tungsten hydrocracking catalyst consisting nominally of 6.5 weight percent nickel and 20 weight percent tungsten on a zeolite-matrix support as described hereinabove was removed from a hydrocracking unit after two years continuous service. Pilot unit activity measurements of a composite sample of the spent catalyst indicated an activity loss of about 33° C. (about 60° F.) relative to a fresh catalyst composite. Analyses of the spent catalyst indicated that sulfur, most likely in the form of sulfate, was present in the catalyst. Other physical characteristics, such as surface area, pore volume, and n-butane capacities of the spent composite samples were significantly lower than those of the fresh catalyst originally charged to the hydrocracking unit, some two years previously. The original catalyst had an activity of 355° C. (672° F.) whereas the spent catalyst, after oxidative regeneration to a carbon content of 0.2 weight percent had an activity of 388° C. (730° F.).

A 350 g sample of the oxidatively regenerated catalyst was treated at 427° C. (800° F.) for four hours with a mixture of sulfur dioxide and water-saturated air in relative proportions of 1 volume sulfur dioxide to 10 volumes air, dry basis. The air was saturated with water at atmospheric pressure and an ambient temperature of 25° C. (77° F.) resulting in an air-water vapor mixture containing approximately 3 volume percent water vapor. The results are shown in the following table:

TABLE I

| Run No. | Catalyst Treatment | Temperature °C. | Temperature (°F.) | Catalyst Activity, °C. | Change* in Activity, °C. |
|---|---|---|---|---|---|
| 1 | None | — | — | 388 | — |
| 2 | SO$_2$, wet air | 427 | 800 | 381 | +7 |

*Activity change relative to regenerated untreated catalyst;
+indicates activity increase.

Activity is expressed as the temperature required for conversion of a 28.8°API reference charge stock to a 42°API product after 50 to 100 hours on stream with a liquid hourly space velocity (LHSV) of 1.0, a pressure of 104 bars (1500 psig) and a hydrogen feed rate of 1.69 cubic meters per liter of charge stock (9500 standard cubic feet per barrel). Conversion is maintained at a constant level of 30 percent per pass by adjustment of temperature and is defined as 100 minus the volume percent of 204° C. (400° F.) plus product based on the volume of fresh feed processed.

EXAMPLE 2

In a series of test runs, Runs 3 to 8 of the following table, 350 g. each of several samples of fresh catalyst were treated for four hours at atmospheric pressure with a mixture of sulfur dioxide and air in the ratio of 1 volume sulfur dioxide for each 10 volumes of air. In Runs 3–8 which included water vapor, the water vapor amounted to about 3 percent of the volume of the air and water vapor mixture. In all of the runs, dry air was supplied at a rate of 1.4 cubic feet per hour and sulfur dioxide was introduced into the air stream at the rate of 0.14 cubic feet per hour. In Runs 4 to 6 the dry air was saturated with water at 25° C. to produce the wet air by saturating the air with water vapor at 25° C. The weight of the catalyst sample in each run was 350 grams. Results are indicated in the following table:

TABLE II

| Run No. | Catalyst Treatment | Treatment Temperature °C. | Treatment Temperature (°F.) | Catalyst Activity, °C. Initial | Catalyst Activity, °C. Final | Change* in Activity, °C. |
|---|---|---|---|---|---|---|
| 3 | SO$_2$, dry air | 427 | (800) | 355 | 354.5 | −0.5 |
| 4 | SO$_2$, wet air | 204 | (400) | 349 | 352 | +3 |
| 5 | SO$_2$, wet air | 316 | (600) | 349 | 352 | +3 |
| 6 | SO$_2$, wet air | 427 | (800) | 349 | 352 | +3 |
| 7 | SO$_2$, wet air | 427 | (800) | 343 | 349 | +6 |
| 8 | SO$_2$, wet air | 538 | (1000) | 359.5 | 355.5 | −4 |

*Activity change relative to untreated catalyst from same sample; + indicates activity increase, − indicates activity decrease.

It will be evident from the foregoing examples that the treatment with sulfur dioxide and wet air at temperatures in the range of 200° to 450° C. effectively improves the activity of both fresh catalyst and regenerated catalyst.

I claim:

1. In a process for hydrocracking petroleum charge stocks wherein a hydrocarbon oil is contacted under hydrocracking conditions with a catalyst comprising a hydrogenating component selected from the group consisting of Group VIII metals, Group VI metals, Group VII metals, their compounds and mixtures thereof supported on a cracking component comprising an acidic solid contact material selected from the group consisting of alumina, silica, magnesia, zirconia, and beryllia, mixtures and composites thereof, the improvement which comprises contacting said catalyst with a mixture of gases comprising sulfur dioxide, water vapor, and oxygen at a temperature within the range of 200° to 425° C. for a period of time within the range of 2 to 24 hours and thereafter contacting said catalyst under hydrocracking conditions in the presence of added hydrogen with said hydrocarbon oil charge stock.

2. A process according to claim 1 wherein said mixture comprises 85 to 94 volume % air and the balance sulfur dioxide and water.

3. A process according to claim 2 wherein said mixture contains from 5 to 10 volume percent sulfur dioxide, from 1 to 5 volume percent water vapor and from 94 to 85 volume percent air.

4. A process according to claim 1 wherein said catalyst contains 5 to 10 weight percent nickel and 5 to 30 weight percent tungsten.

5. A process according to claim 1 wherein said catalyst contains from 0.5 to 1.0 weight percent platinum.

6. The process of claim 1 in which the catalyst comprises as the hydrogenating component a Group VIII metal or compound thereof in an amount between 0.5 and 10% by weight of the catalyst composite and the cracking component consists essentially of 10–60 weight percent hydrogen zeolite Y in a matrix composed of a mixture of from about 60–90 weight percent silica and 40–10 weight percent alumina and the catalyst is contacted with a mixture of sulfur dioxide, oxygen containing gas and water vapor at a temperature in the range of 200° to 425° C. for a period of time within the range of 2 to 24 hours at a volumetric hourly space velocity of 1 to 500 volumes of said gaseous mixture per volume of catalyst per hour.

7. A process according to claim 6 wherein said gaseous mixture comprises from 5 to 10 volume percent sulfur dioxide, from 1 to 5 volume percent water vapor and from 94 to 85 volume percent oxygen-containing gas.

8. A process according to claim 6 wherein said Group VIII hydrogenating component comprises 0.5 to 1 weight percent platinum.

9. A process according to claim 6 wherein said hydrogenating component comprises 5 to 10 weight percent nickel and 5 to 30 weight percent tungsten.

10. The process of claim 6 in which the catalyst prior to the contacting is free from or substantially free from carbon.

* * * * *